GEORGE B. GREEN.
Improvement in Ottomans and Hassocks.

No. 123,821. Patented Feb. 20, 1872.

123,821

UNITED STATES PATENT OFFICE.

GEORGE B. GREEN, OF STAFFORDSHIRE, ENGLAND.

IMPROVEMENT IN OTTOMANS AND HASSOCKS.

Specification forming part of Letters Patent No. 123,821, dated February 20, 1872; antedated February 5, 1872.

I, GEORGE B. GREEN, of Staffordshire, England, have invented a certain Improvement in Ottomans and Hassocks, of which the following is a specification:

Nature and Object of the Invention.

My invention relates to an improvement in that class of household furniture known as ottomans and hassocks, the object being to make them of various ornamental forms, and also to render them stronger and more durable.

Description of the Accompanying Drawing.

Figure 1:
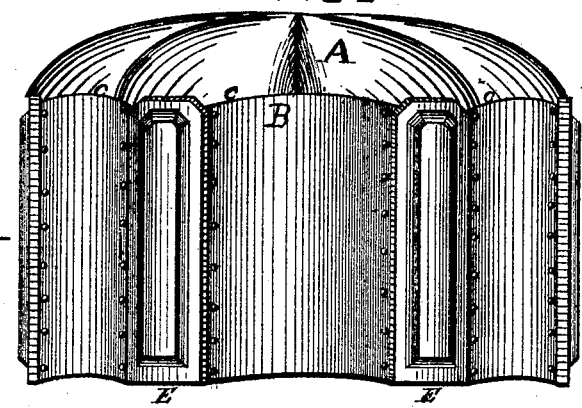
Figure 2:
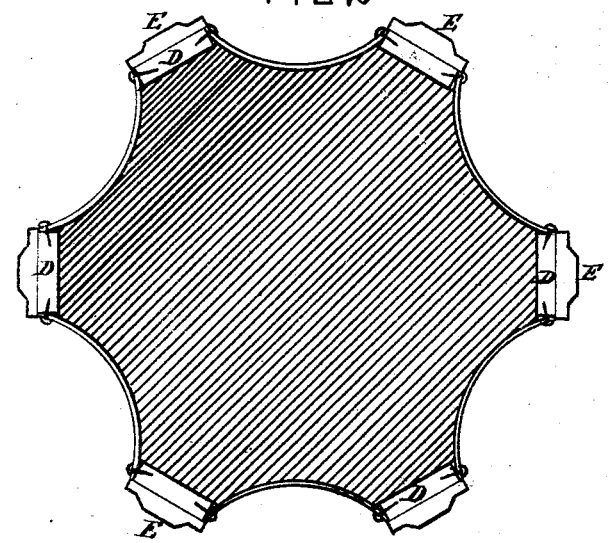
Figure 3:
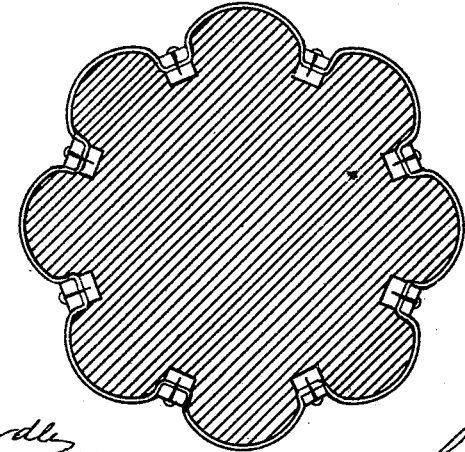

Figure 1 is a side view of my improvement in ottomans and hassocks. Fig. 2 is a plan view on the line $a\,b$ of Fig. 1. Fig. 3 is a plan view of a different form of ottoman or hassock embodying my invention.

In my improvement I take as many pieces of cloth, carpet, or other suitable material, to correspond in number and shape to the form I intend to give the ottoman or hassock, and cord and sew them together to form the top A, Fig. 1. I then take different pieces of cloth B B, which are cut in rectangular or any other desired shape, and sew them to the outer edge $c\,c$ of the top piece A, leaving sufficient space between them to insert the vertical strips or supports D D D; the material being tacked or secured in any suitable manner to the edges of the said supports, as shown in Fig. 2 of the drawing. The ottoman thus prepared is placed in a mold of any desired shape, and stuffed and pressed, and after being trimmed I secure to the vertical supports D D D, in any suitable manner, ornamental pieces E E E, made of wood, metal, or any appropriate material, and carved, molded, or stamped in any design.

I do not wish to confine myself exclusively to the above mode of manipulation or construction, as the cylinder of the ottoman or hassock may be made of one continuous piece of cloth or carpet, and in the shape as shown in Fig. 3, with the panels or divisions of a convex or other desired form; and, if desired, the strips or supports may be dispensed with and the cloth tacked directly to the molding-pieces E E E. The bottom or base of the ottoman and hassock may be formed of carpet or cloth, or of a solid block of wood, or other material.

Claim.

I claim—

The ornamental pieces E, made in any desired shape, of wood, metal, or other suitable material, and carved, molded, or stamped in any design, secured by any suitable means directly to the material forming the sides of an ottoman or hassock, as and for the purpose herein described.

GEORGE B. GREEN.

Witnesses:
TAYLOR WINDLE,
ISAAC R. OAKFORD.